United States Patent [19]

Ballenger, Jr. et al.

[11] Patent Number: 5,164,002
[45] Date of Patent: Nov. 17, 1992

[54] ANTISTRIPPING ASPHALT COMPOSITIONS AND ADDITIVES USED THEREIN

[76] Inventors: William T. Ballenger, Jr., Rte. 5 Box 69B, San Benito, Tex. 78586; Terry J. Light, Sr., Rte. 5 Box 303, Livingston, Tex. 77351

[21] Appl. No.: 771,566

[22] Filed: Oct. 7, 1991

[51] Int. Cl.$^5$ .............................................. C09D 7/00
[52] U.S. Cl. .................................. 106/267; 106/246; 106/248
[58] Field of Search ............... 106/244, 248, 252, 267, 106/246

[56] References Cited

U.S. PATENT DOCUMENTS 5,053,118 10/1991 Houser ........................... 208/428

Primary Examiner—Theodore Morris
Assistant Examiner—David M. Brunsman
Attorney, Agent, or Firm—Neal J. Mosely

[57] ABSTRACT

An improved anti-stripping additive for asphalt/aggregate composition used in constructing and repairing highways, pavements, driveways and parking lots consists essentially of a citrus terpene (4-isopropyl 1-methylcyclohexene) D-limonene mixed with a vegetable oil such as cottonseed oil, soya oil, rapeseed (canola) oil, peanut oil, corn oil, sunflower oil, palm oil, coconut oil, and palm kernel oil, etc. and a silicone oil dispersant. A preferred composition cosists essentially of 10–15 parts citrus terpene (D-limonene) and 85–90 parts vegetable oil, and an effective amount, up to 2 parts, of silicone oil, for dispersing the vegetable oil and terpene, the parts in the composition totaling 100. When 0.5–1.0 parts of this composition are mixed with 99.0–99.5 parts asphalt and 4–8 parts of the mixture are added to 92–96 parts of aggregate, the resulting asphalt/aggregate may be used as a hot-mix asphalt, hot-mix cold lay asphalt, slurry seal and precoat asphalt for paving. The antistripping additive is effective to prevent water damage to asphalt pavements and is biodegradable and ecologically acceptable and substantially reduces odor of asphalt compositions.

15 Claims, No Drawings

ANTISTRIPPING ASPHALT COMPOSITIONS AND ADDITIVES USED THEREIN

BACKGROUND OF THE INVENTION

1. Field of the Invention

This invention relates generally to anti-stripping additives for asphalt/aggregate paving mixtures and more particularly to anti-stripping additives and asphalt/aggregate paving mixtures containing such additives which are biodegradable and ecologically acceptable.

2. Brief Description of the Prior Art

The need for anti-stripping additives for asphalt/aggregate paving mixtures is well known and a large number of such additives are commercially available. The commercially available additives, however, are not biodegradable and ecologically acceptable, and consequently governmental environmental authorities have been urging the industry to find additives which perform their intended purpose of preventing water damage to pavement and are biodegradable when leached from the pavement during use. There is also a need to reduce the odor from processing asphalt compositions.

There are several patents which illustrate various anti-stripping additive compositions for asphalt/aggregate paving.

Hopkins U.S. Pat. No. 4,836,857 discloses the use of the reaction product of a tall oil acid with an amine or polyamine as an anti-strip additive for asphalt/aggregate paving mixes together with a strength improver additive. Ward U.S. Pat. No. 4,479,827 discloses the use of tall oil acids as an anti-strip additive for asphalt/aggregate paving mixes.

Hopkins U.S. Pat. No. 5,017,230 discloses the use of the reaction product of a carboxylic acid with an amine or polyamine as an anti-strip additive for asphalt/aggregate paving mixes together with a strength improver additive.

Hunter U.S. Pat. No. 4,425,453 discloses the use of the terpene resins as additives for asphalt/aggregate paving mixes together.

Schilling U.S. Pat. No. 4,806,166 discloses the use of the reaction product of a tall oil acid with triethanol amine as an anti-strip additive for asphalt/aggregate paving mixes.

Kostusyk U.S. Pat. No. 4,789,402 discloses the use of the condensation product of an amine, an aldehyde and an alkylated phenol as an anti-strip additive for asphalt/aggregate paving mixes.

Gilmore U.S. Pat. No. 4,743,304 discloses the use of imidazolines, polyamines, alkoxylated polyamines, amino-carboxylic esters, amide-amines, and mixtures thereof as anti-strip additives for asphalt/aggregate paving mixes together with other ingredients.

Pitchford U.S. Pat. No. 3,096,191 discloses the use of various oils mixed with asphaltic sulfonic acid neutralized with an amine as anti-strip additives for asphalt/aggregate paving mixes.

The present invention is distinguished over the prior art in general, and these patents in particular by providing an improved anti-stripping additive for asphalt/aggregate composition used in constructing and repairing highways, pavements, driveways and parking lots consists essentially of a citrus terpene (4-isopropyl 1-methylcyclohexene) D-limonene mixed with a vegetable oil such as cottonseed oil, soya oil, rapeseed (canola) oil, peanut oil, corn oil, sunflower oil, palm oil, coconut oil, and palm kernel oil. etc. and a silicone oil dispersant.

A preferred composition consists essentially of 10-15 parts citrus terpene (D-limonene) and 85-90 parts vegetable oil, and an effective amount up to about 2 parts, of silicone oil, for dispersing the vegetable oil and terpene, the parts in the composition totaling 100. When 0.5-1.0 parts of this composition are mixed with 99.0-99.5 parts asphalt and 4-8 parts of the mixture are added to 92-96 parts of aggregate, the resulting asphalt/aggregate may be used as a hot-mix asphalt, hot-mix cold lay asphalt, slurry seal and precoat asphalt for paving. The anti-stripping additive is effective to prevent water damage to asphalt pavements and is biodegradable and ecologically acceptable and substantially reduces odor of asphalt compositions.

SUMMARY OF THE INVENTION

It is therefore an object of the present invention to provide a new and improved anti-stripping additive for asphalt paving materials to improve adhesion to aggregate and reduce or eliminate water damage.

It is another object of this invention is to provide a new and improved anti-stripping additive for asphalt paving materials to improve adhesion to aggregate and reduce or eliminate water dam age which is biodegradable and ecologically acceptable and substantially reduces odor of asphalt compositions.

Another object of this invention is to provide a new and improved anti-stripping additive for asphalt paving materials to improve adhesion to aggregate and reduce or eliminate water damage which consists essentially of a vegetable oil, D-limonene, and a silicone oil.

Another object of this invention is to provide a new and improved anti-stripping additive for asphalt paving materials to improve adhesion to aggregate and reduce or eliminate water damage which consists essentially of a vegetable oil 85-90, D-limonene 10-15 parts, and a silicone oil up to 2.0 parts.

Still another object of this invention is to provide an asphalt composition containing a novel anti-stripping additive to improve adhesion to aggregate and reduce or eliminate water damage.

Still another object of this invention is to provide an asphalt composition containing a novel anti-stripping additive to improve adhesion to aggregate and reduce or eliminate water damage and substantially reduce odor, and which may be used as a hot-mix asphalt, hot-mix cold lay asphalt, slurry seal and precoat asphalt for paving.

Still another object of this invention is to provide an asphalt composition containing a novel anti-stripping additive to improve adhesion to aggregate and reduce or eliminate water damage and which is biodegradable and ecologically acceptable and substantially reduces odor of asphalt compositions.

Still another object of this invention is to provide an asphalt composition containing a new and improved anti-stripping additive to improve adhesion to aggregate and reduce or eliminate water damage which consists essentially of a vegetable oil, D-limonene, and a silicone oil.

A further object of this invention is to provide an asphalt composition containing 0.5-1.0 parts of an improved anti-stripping additive for asphalt paving materials to improve adhesion to aggregate and reduce or eliminate water damage which consists essentially of a vegetable oil 85-90, D-limonene 10-15 parts, and a silicone oil up to 2 parts.

A further object of this invention is to provide an asphalt/aggregate paving composition comprising 4-8 parts of an asphalt/anti-stripping composition containing 0.5-1.0 parts of an anti-stripping additive to improve adhesion to aggregate and reduce or eliminate water damage which is biodegradable and ecologically acceptable.

A further object of this invention is to provide an asphalt/aggregate paving composition comprising 4-8 parts of an asphalt/anti-stripping composition containing 0.5-1.0 parts of an anti-stripping additive to improve adhesion to aggregate and reduce or eliminate water damage which is biodegradable and ecologically acceptable which consists essentially of a vegetable oil, D-limonene, and a silicone oil which consists essentially of a vegetable oil, D-limonene, and a silicone oil.

A further object of this invention is to provide an asphalt/aggregate paving composition comprising 4-8 parts of an asphalt/anti-stripping composition containing 0.5-1.0 parts of an anti-stripping additive to improve adhesion to aggregate and reduce or eliminate water damage which is biodegradable and ecologically acceptable which consists essentially of a vegetable oil 85-90, D-limonene 10-15 parts, and a silicone oil up to 2 parts.

Other objects of the invention will become apparent from time to time throughout the specification and claims as hereinafter related.

The above noted objects and other objects of the invention are accomplished by a novel improved anti-stripping additive for asphalt/aggregate composition used in constructing and repairing highways, pavements, driveways and parking lots consists essentially of a citrus terpene (4-isopropyl 1-methylcyclohexene) D-limonene mixed with a vegetable oil such as cottonseed oil, soya oil, rapeseed (canola) oil, peanut oil, corn oil, sunflower oil, palm oil, coconut oil, and palm kernel oil. etc. and a silicone oil dispersant. A preferred composition consists essentially of 10-15 parts citrus terpene (D-limonene) and 85-90 parts vegetable oil, and an effective amount up to about 2 parts up to 2 parts, of silicone oil, for dispersing the vegetable oil and terpene, the parts in the composition totaling 100. When 0.5-1.0 parts of this composition are mixed with 99.0-99.5 parts asphalt and 4-8 parts of the mixture are added to 92-96 parts of aggregate, the resulting asphalt/aggregate may be used as a hot-mix asphalt, hot-mix cold lay asphalt, slurry seal and precoat asphalt for paving. The anti-stripping additive is effective to prevent water damage to asphalt pavements and is biodegradable and ecologically acceptable and substantially reduces odor of asphalt compositions.

DESCRIPTION OF THE PREFERRED EMBODIMENTS

The present invention is directed to novel antistripping compositions for paving asphalts, to asphalt compositions containing such additives and to asphalt/aggregate mixed containing the antistripping additives and to substantially reduce the odor of asphalt compositions. The term asphalt composition (or compositions) as used hereinafter means asphalt, paving asphalts, asphalt compositions containing additives, asphalt/aggregate mixes, hot mix asphalts, hot-mix cold lay asphalt, slurry seal and precoat asphalts for paving.

The antistripping additives consist essentially of a citrus terpene (4-isopropyl 1-methylcyclohexene) D-limonene, derived from citrus oils, mixed with a vegetable oil such as cottonseed oil, soya oil, rapeseed (canola) oil, peanut oil, corn oil, sunflower oil, palm oil, coconut oil, and palm kernel oil. etc. and a silicone oil dispersant. The citrus terpene D-limonene described in the Concise Chemical Dictionary as an optically active terpene closely related to isoprene (with physical and chemical properties given) and is derived from lemons, oranges, etc. This additive has been determined to be biodegradable and ecologically acceptable.

A preferred composition consists essentially of 10-15 parts citrus terpene (D-limonene) and 85-90 parts vegetable oil, and an effective amount up to about 2 parts up to 2 parts, of silicone oil, for dispersing the vegetable oil and terpene, the parts in the composition totaling 100. In formulating the composition, the silicone oil is first mixed with the D-limonene (because it is more soluble in this component) and the vegetable oil mixed in to produce the desired composition. This additive composition must be kept at temperatures above 65° F. (but not substantially exceeding usual hot melt temperatures for paving asphalt) to maintain fluidity. It is preferred to use a heated storage tank for this additive.

Next, 0.5-1.0 parts of this composition were thoroughly mixed with 99.0-99.5 parts asphalt. Then 4-8 parts of the asphalt/additive mixture were added to 92-96 parts of aggregate. The resulting asphalt/aggregate composition has been found useful as a hot-mix asphalt for paving. The anti-stripping additive is effective to prevent water damage to asphalt pavements and is biodegradable and ecologically acceptable.

Asphalt/aggregate mixes containing this additive in the recited proportions were tested according to Texas Dept of Highways Test Methods 530-C (revised September 1984) and 531 and AST D-1074 and D-1075 to determine the amount of stripping and the percentage of retained strength (tensile strength after treatment as a fraction of tensile strength before treatment). Texas Dept. of Highways requires a strength ratio of 0.70 or more for acceptability. Currently available antistripping additives result in retained strength ratios of 0.70-0.75 but are materials which when leached from the pavement are hazardous to the environment.

The following Examples are representative of the embodiments of this invention and indicate their acceptability.

EXAMPLE 1

An antistripping composition was prepared by thoroughly mixing silicone oil into D-limonene at room temperature and cottonseed oil mixed in. In formulating the composition, the silicone oil is first mixed with the D-limonene (because it is more soluble in this component) and the vegetable oil mixed in to produce the desired composition. The final proportions were 0.5 parts silicone oil; 90 parts cottonseed oil and 10 parts D-limonene.

This antistripping composition was maintained at a temperature above 65° F. to produce a fluidity satisfactory for further processing. A mixture was prepared of 1.0 part of the antistripping composition with 99.0 parts of asphalt. Then 4.2 parts asphalt/antistripping agent composition was mixed with 95.8 parts aggregate and tested and found satisfactory for highway paving use or for patching.

Samples of the material were formed into 4" diameter test specimens and evaluated according to Texas Dept. of Highways Test Methods 531-C, ASTM D-1074 and D-1075 and found to have a retained strength ratio of 0.765 or 76.5%, which is sufficient to meet Texas Highway Dept. standards. The antistripping agent is biodegradable and meets environmental standards. It also reduces substantially the odor from processing asphalt mixes or from spills in the storage ares. The asphalt-antistripping composition may be used as a hot-mix asphalt, hot-mix cold lay asphalt, slurry seal and precoat asphalt for paving.

EXAMPLE 2

An antistripping composition is prepared by thoroughly mixing silicone oil into D-limonene at room temperature and soya oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts soya oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (6 parts) is then mixed with aggregate (94 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 3

An antistripping composition is prepared by thoroughly mixing silicone oil into D-limonene at room temperature and canola oil mixed in. In formulating the composition, the silicone oil is first mixed with the D-limonene (because it is more soluble in this component) and the vegetable oil mixed in to produce the desired composition. The final proportions are 0.80 parts silicone oil; 89.6 parts canola oil and 9.6 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (7 parts) is then mixed 25 with aggregate (93 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 4

An antistripping composition is prepared by thoroughly mixing silicone oil into D-limonene at room temperature and peanut oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts peanut oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (6 parts) is then mixed with aggregate (94 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 5

An antistripping composition is prepared by thoroughly mixing silicone oil into D-limonene at room temperature and corn oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts corn oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (8 parts) is then mixed with aggregate (92 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The anti-stripping agent is biodegradable and meets environmental standards.

EXAMPLE 6

An antistripping composition is prepared by thoroughly mixing silicone oil into D-limonene at room temperature and sunflower oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts sunflower oil and 9.5 parts D-limonene.

This antistripping composition is maintained at a temperature above 65° F. to produce fluidity satisfactory for further processing. A mixture is prepared of 1.0 part of the antistripping composition with 99.0 parts of asphalt. The asphalt/antistripping agent composition (4.5 parts) is then mixed with aggregate (96.5 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 7

An antistripping composition is prepared by thoroughly mixing silicone oil into D-limonene at room temperature and palm oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts palm oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (4 parts) is then mixed with aggregate (96 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 8

An antistripping composition is prepared by thoroughly mixing silicone oil into D-limonene at room temperature and coconut oil mixed in. In formulating the composition, the silicone oil is first mixed with the D-limonene (because it is more soluble in this component) and the vegetable oil mixed in to produce the desired composition. The final proportions ar 1.0 parts silicone oil; 89.5 parts coconut oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (5 parts) is then mixed with aggregate (95 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 9

An antistripping composition is prepared by thoroughly mixing silicone oil into D-limonene at room temperature and peanut oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts peanut oil and 9.5 parts D-limonene.

This antistripping composition is maintained at a temperature above 65° F. to produce a fluidity satisfactory for further processing. A mixture is prepared of 1.0 part of the anti stripping composition with 99.0 parts of asphalt. The asphalt/antistripping agent composition (8 parts) is then mixed with aggregate (92 parts) and is satisfactory for highway paving use or for patching.

Samples of the material are formed into 4" diameter test specimens and evaluated according to ASTM D-1074 and D-1075 and found to have a retained strength ratio of 0.70–0.80 which is sufficient to meet Texas Highway Dept. standards. The antistripping agent is biodegradable and meets environmental standards.

EXAMPLE 10

An antistripping composition is prepared by thoroughly mixing silicone oil into D-limonene at room temperature and palm kernel oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts palm kernel oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (6 parts) is then mixed with aggregate (94 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

EXAMPLE 11

An antistripping composition is prepared by thoroughly mixing silicone oil into D-limonene at room temperature and a mixture of equal parts of cottonseed oil and soya oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts cottonseed/soya oil and 9.5 parts D-limonene.

This antistripping composition is maintained at a temperature above 65° F. to produce a fluidity satisfactory for further processing. A mixture is prepared of 1.0 part of the antistripping composition with 99.0 parts of asphalt. The asphalt/antistripping agent composition (6.5 parts) is then mixed with aggregate (93.5 parts) and is satisfactory for highway paving use or for patching.

Samples of the material are formed into 4" diameter test specimens and evaluated according to ASTM D-1074 and D-1075 and found to have a retained strength ratio of 0.70–0.80, which is sufficient to meet Texas Highway Dept. standards. The antistripping agent is biodegradable and meets environmental standards.

While this invention has been described fully and completely with special emphasis on certain preferred embodiments, it should be understood that within the scope of the appended claims the invention may be practiced otherwise than as specifically described herein.

We claim:

1. An antistripping composition for use with asphalt compositions to reduce water damage in paving, and to reduce odor from asphalt compositions, which consists essentially of
    a vegetable oil,
    D-limonene, and
    a silicone oil dispersing agent in an amount facilitating the mixture of said vegetable oil and D-limonene.

2. An antistripping composition according to claim 1 which consists essentially of
    85–90 parts vegetable oil,
    10–15 parts D-limonene, and
    an amount up to about 2 parts silicone oil,
    the parts in the composition totaling 100.

3. An antistripping composition according to claim 1 in which
    said vegetable oil is selected from the group consisting of cottonseed oil, soya oil, canola oil, peanut oil, corn oil, sunflower oil, palm oil, coconut oil, and palm kernel oil, and mixtures thereof.

4. An asphalt composition containing an amount of an antistripping composition, effective to reduce water damage thereto, and to reduce odor therefrom,
said antistripping composition consists essentially of
a vegetable oil,
D-limonene, and
a silicone oil dispersing agent in an amount facilitating the mixture of said vegetable oil and D-limonene, 5. An asphalt composition according to claim 4 in which
said antistripping composition consists essentially of
85-90 parts vegetable oil,
10-15 parts D-limonene, and
said dispersing agent comprising up to about 2 parts silicone oil,
the parts in the antistripping composition totaling 100.

6. An asphalt composition according to claim 4 in which
said vegetable oil in said antistripping composition is selected from the group consisting of cottonseed oil, soya oil, canola oil, peanut oil, corn oil, sunflower oil, palm oil, coconut oil, and palm kernel oil, and mixtures thereof.

7. An asphalt composition according to claim 4 comprising
99.0-99.5 parts asphalt, and
0.5-1.0 parts antistripping composition.

8. An asphalt/aggregate paving and patching composition comprising
a major amount of aggregate, and
a minor amount of an asphalt composition,
said asphalt composition comprising a paving asphalt and an effective amount of an antistripping composition,
said antistripping composition consisting essentially of
a vegetable oil,
D-limonene, and
a silicone oil dispersing agent in an amount facilitating the mixture of said vegetable oil and D-limonene,
said asphalt/aggregate paving and patching composition being characterized by reduced susceptibility to water damage and reduced odor.

9. An asphalt/aggregate paving and patching composition according to claim 8 in which
said antistripping composition in said asphalt composition consists essentially of
85-90 parts vegetable oil,
10-15 parts D-limonene, and
an amount up to about 2 parts silicone oil,
the parts in the antistripping composition totaling 100.

10. An asphalt/aggregate paving and patching composition according to claim 8 in which
said vegetable oil in said antistripping composition is selected from the group consisting of cottonseed oil, soya oil, canola oil, peanut oil, corn oil, sunflower oil, palm oil, coconut oil, and palm kernel oil, and mixtures thereof.

11. An asphalt/aggregate paving and patching composition according to claim 8 in which
said antistripping composition consists essentially of
85-90 parts of a vegetable oil selected from the group consisting of cottonseed oil, soya oil, canola oil, peanut oil, corn oil, sunflower oil, palm oil, coconut oil, and palm kernel oil, and mixtures thereof,
10-15 parts D-limonene, and
an effective amount up to about 2 parts silicone oil dispersing agent,
the parts in the antistripping composition totaling 100.

12. An asphalt/aggregate paving and patching composition according to claim 8 comprising
4-8 parts asphalt/antistripping composition, and
92-96 parts aggregate.

13. An asphalt/aggregate paving and patching composition according to claim 12 in which
said antistripping composition in said asphalt composition consists essentially of
85-90 parts vegetable oil,
10-15 parts D-limonene, and
an effective amount up to about 2 parts silicone oil dispersing agent,
the parts in the antistripping composition totaling 100.

14. An asphalt/aggregate paving and patching composition according to claim 12 in which
said vegetable oil in said antistripping composition is selected from the group consisting of cottonseed oil, soya oil, canola oil, peanut oil, corn oil, sunflower oil, palm oil, coconut oil, and palm kernel oil, and mixtures thereof.

15. An asphalt/aggregate paving and patching composition according to claim 12 in which
said antistripping composition consists essentially of
85-90 parts of a vegetable oil selected from the group consisting of cottonseed oil, soya oil, canola oil, peanut oil, corn oil, sunflower oil, palm oil, coconut oil, and palm kernel oil, and mixtures thereof,
10-15 parts D-limonene, and
an effective amount up to about 2 parts dispersing agent,
the parts in the antistripping composition totaling 100.

* * * * *